United States Patent [19]

Roggenburg, Jr. et al.

[11] 4,332,750
[45] Jun. 1, 1982

[54] BLOW-MOLDING AND DEGATING HOLLOW SHAPES

[75] Inventors: Stanley L. Roggenburg, Jr.; Michael E. Tully, both of Staten Island, N.Y.

[73] Assignee: Essex Chemical Corporation, Clifton, N.J.

[21] Appl. No.: 129,262

[22] Filed: Mar. 11, 1980

[51] Int. Cl.³ .................. B29C 17/07; B29C 17/08
[52] U.S. Cl. .................................. 264/23; 264/524; 264/527; 264/529; 264/536; 425/174.2; 425/525; 425/527; 425/536
[58] Field of Search ............... 264/23, 524, 527, 536, 264/161, 529; 425/174.2, 525, 527, 531, 532, 536, 538, 806 R, 806 A, 530

[56] References Cited

U.S. PATENT DOCUMENTS

| 2,349,177 | 5/1944 | Kopitke | 264/524 |
| 3,172,152 | 3/1965 | Uhlig | 425/806 X |
| 3,579,620 | 5/1971 | Pettersson | 425/525 X |
| 3,803,280 | 4/1974 | Gilbert | 425/531 X |

FOREIGN PATENT DOCUMENTS

| 40-4480 | 3/1965 | Japan | 264/161 |
| 51-11856 | 1/1976 | Japan | 425/174.2 |
| 1028480 | 5/1966 | United Kingdom | 425/525 |

Primary Examiner—Jan H. Silbaugh
Attorney, Agent, or Firm—Kenyon & Kenyon

[57] ABSTRACT

Hollow shapes are blow molded with a special form of gate connecting the shapes to the parison from which they are blow molded and permitting subsequent degating of the shapes by ultrasonic mechanical vibration applied to the gates.

1 Claim, 9 Drawing Figures

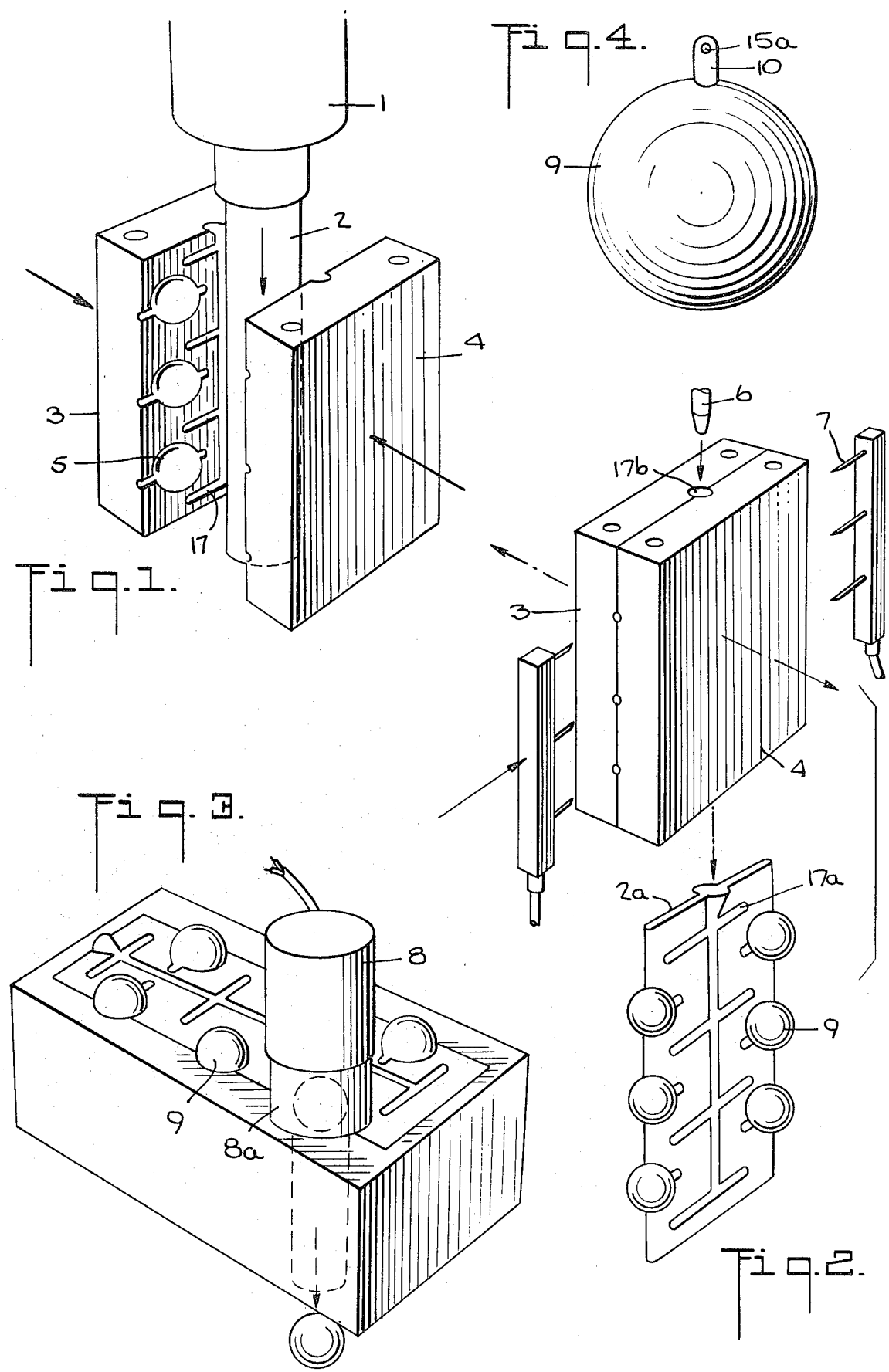

BLOW-MOLDING AND DEGATING HOLLOW SHAPES

BACKGROUND OF THE INVENTION

Extrusion blow molding is a technique for making hollow thermoplastic shapes, and ultrasonic mechanical vibration or energy is used to fuse thermoplastics for cutting and jointing. The basic principles of each are described by the *Modern Plastics Encyclopedia*, 1979-1980, in its blow molding section, starting on page 230, and its ultrasonic assembly section, starting on page 432, this text by this reference to it being made a part of the present disclosure.

Briefly stated, extrusion blow-molding comprises extruding a thermally plasticized thermoplastic tubular parison on which a two-part blow molding die having an appropriately shaped cavity is closed so as to flatten the parison, pressurized air is injected into the parison portion encompassed by the cavity so as to blow mold this portion into the mold cavity, the parison quickly cools to at least a semi-rigid condition, and the mold is then opened and the blown parison removed. The mold parts are each formed with one-half of the molding cavity and they may have a protruding edge or pinch-off so that when the mold parts close on the parison, only a compressed thin film or flash connects the molded shape to the remaining portion of the parison, permitting easy subsequent trimming. Multi-cavity molds are used for small shapes.

For ultrasonic fusion an electrically powered ultrasonic mechanical vibrator connects with a horn which is resonant at the frequency used, absorption of this energy by a thermoplastic contacted by the horn resulting in heating causing fusion. This has been used for jointing thermoplastic parts. For an energy director joint, one of the parts is molded with a small triangular bead which directs the ultrasonic energy or vibration to the other of two parts being jointed together.

Some hollow shapes must be produced at low cost and in large quantities, as exemplified by Christmas tree balls. In this case a multi-cavity mold can be used. The pinch-off, if necessary, can be made so that a thicker flash results, or not used at all, so that when the die opens, the flattened parison and its multiplicity of blown balls can be handled without the balls falling and causing collection problems. The plastic is solidified because although not mentioned before, the dies are always cooled forcibly, as by water cooling, to reduce the die-closed interval to a minimum; but the parison and its retained balls are limber or floppy so as to make handling difficult. To correct this, molds have been designed so that the blow passages leading from the air supply to the parison portions in the cavities are enlarged so that a rigidifying spine is blow molded into the parison with its terminating ends opening into the blown shapes. These terminating ends interrupt the peripheral continuity of the flash holding the shapes to the blown parison.

In the above practice the flash holding the blown shape connected to the parison is called a gate and degating is required to free the shapes. Degating by die cutting results in large accumulations of plastic dust or fragments. After removal of the blown shapes, parisons are customarily reprocessed and returned to the parison extruder. This practice is made difficult in the case of dust or fragments. The use of a complete die-cut in the die is impractical because of the multiplicity of falling balls or other shapes involved. In addition, the die parts must be provided with die cutting tools with their consequent wear and sharpening problems, and there is the requirement that the die parts must exactly register parallel together during die closing, keeping in mind that commercially available blow-molding machines do not usually close a die precisely and with its two parts exactly parallel with each other as required for die cutting.

This need for exact registration also prevails when the shapes, such as the Christmas tree balls, are degated by using a die-cutting press. When applied to the making of Christmas tree balls, this has required an operator who manually effects the necessary precise registration of the blown parison relative to the die-cutting tools, eliminating the possibility for a completely automated production line.

A serious problem connected with mechanical or die cutting degating has been that it is impossible to produce shapes which do not show a fragmentation line where the die cut has been made. In the case of Christmas tree balls to be ultimately covered by decorative threads or yarn to give the familiar, normally red, apparently satin covered balls, fragmentation lines have been visibly apparent from outside of the covering. Such balls have been made of solid moldings of lightweight plastic material.

The object of the present invention is to enable the making of injection-blow molded hollow shapes, exemplified by Christmas tree balls, without involving the difficulties described above, and to provide a new form of extrusion blow-molded shape having an exterior which is free from evidence of die cutting, and in the case of Christmas tree balls, can be covered to provide flawless, satin-like covering without requiring the use of solid plastic balls. Ancillary to this, is the provision of the possibility for complete automation, including the degating step, by avoiding the need for exact or precise registration between the parison gates and the degating tools used. Furthermore, complete die cutting in the die with its attendant difficulties of handling the released shapes upon die opening, is to be avoided.

SUMMARY OF THE INVENTION

The above object has been attained by making the blow-molding die in the form of the two matched die parts each having a cavity defining half of the outside of the shape to be blow molded and formed in a flat surface so that when the die is closed by clamping the parts together on the thermally plasticized tubular thermoplastic parison, the latter is flattened with a portion enclosed by the blow-molding cavity formed by the two half cavities of the die parts. These flat surfaces, when the die is closed, are spaced apart a distance at least slightly greater than the thickness of the two walls of the flattened parison. The cavity of each die part has its periphery projecting above this flat surface and forming a pinch molding surface which angles from the cavity's periphery to the flat surface in which the cavity is formed. At the cavity this projection periphery is spaced from the opposite corresponding part of the other die part when the die is closed, a distance providing a junction between the pinch formed in the parison and the shape in the cavity resulting from the blow-molding operation carried out substantially as soon as the mold is closed. This junction safely retains the blown shape to the parison when the die is subsequently opened, so as to hold the shape and parison together firmly enough to permit the parison with its blown shape to be handled and even dropped with its fall halted by an abrupt stoppage, without the shape breaking loose from the parison.

When this die is closed on a portion of the parison, the latter being thermally plasticized because just extruded and ready for blow molding, the parison's plastic is wedged, extruded or pinched away from its plastic at the mold cavity periphery, so that the plastic of the two parison layers weld together adjacent to the cavity to form a gate of solid plastic which tapers from the unaffected parison walls to a thin junction which connects the parison with the shape after blowing and opening of the die to release the parison.

The outward extrusion of plastic caused by mold closing is, in effect, forged into the two parison walls so as to thicken them, but room is provided for such thickening by the relief provided by the interspacing of the flat surfaces around the molding cavity formed by the two die parts.

The resulting gate holding the blown shape to the parison differs from the previously described prior art gate in that starting at the blown shape where the gate has its smallest wall thickness, the gate flares outwardly, preferably conically, to the two walls of the flattened tubular parison.

This new gate permits the ultrasonic plastic fusion technique to be used for degating. The resonating horn of the ultrasonic tool can be designed to encircle the blown shape gated to the parison, with the latter held on a suitable fixture preferably leaving the gate unsupported. Exact registration between the tool and the gate is not required and there is a wide tolerance range of permissible resonator positions, it being unnecessary for the horn to literally contact the gate. Assuming an ultrasonic frequency of appropriate frequency is used for the fusion of the plastic used, the ultrasonic energy is directed through the gate directly to its junction with the blown shape, fusion quickly resulting and allowing the shape to fall from the parison.

Because exact registration between the ultrasonic tool and the gate is not necessary, fall automation of an extrusion blow-molding system is made possible. The invention is, of course, applicable to the use of multi-cavity molds.

In the case of shapes which desirably have as smooth an external surface as possible, such as the Christmas balls previously mentioned, a new product results in that the blow-molded shape has an almost invisible parting line free from cut and partially fragmented thermoplastic, and which is formed only from the melted thermoplastic. Due to the fact that the gate in cross section forms what is substantially a point at the junction with the blown shape or ball, the molten plastic line is of small transverse extent and smoothly joins with the balance of the shape's exterior. In the case of a Christmas ball, the previously described covering can be applied to give an external appearance as satisfactory as can be achieved by the use of a solid plastic ball with its undesirable weight and material cost.

The invention involves other details of substantial practical importance illustrated by the accompanying drawings and described by the following detailed description.

DESCRIPTION OF THE DRAWINGS

In the accompanying drawings:

FIG. 1 schematically by a perspective view shows the extrusion of the parison between the opened blow-molding die and thereafter the closing of the die and the blow-molding phases;

FIG. 2, also by a perspective view, shows the blown parison with in this case six Christmas tree balls retained by the parison via the gates;

FIG. 3, again a perspective view, schematically illustrates the ultrasonic degating;

FIG. 4 is a side view of the resulting Christmas tree ball;

DETAILED DESCRIPTION OF THE INVENTION

Figure 5:
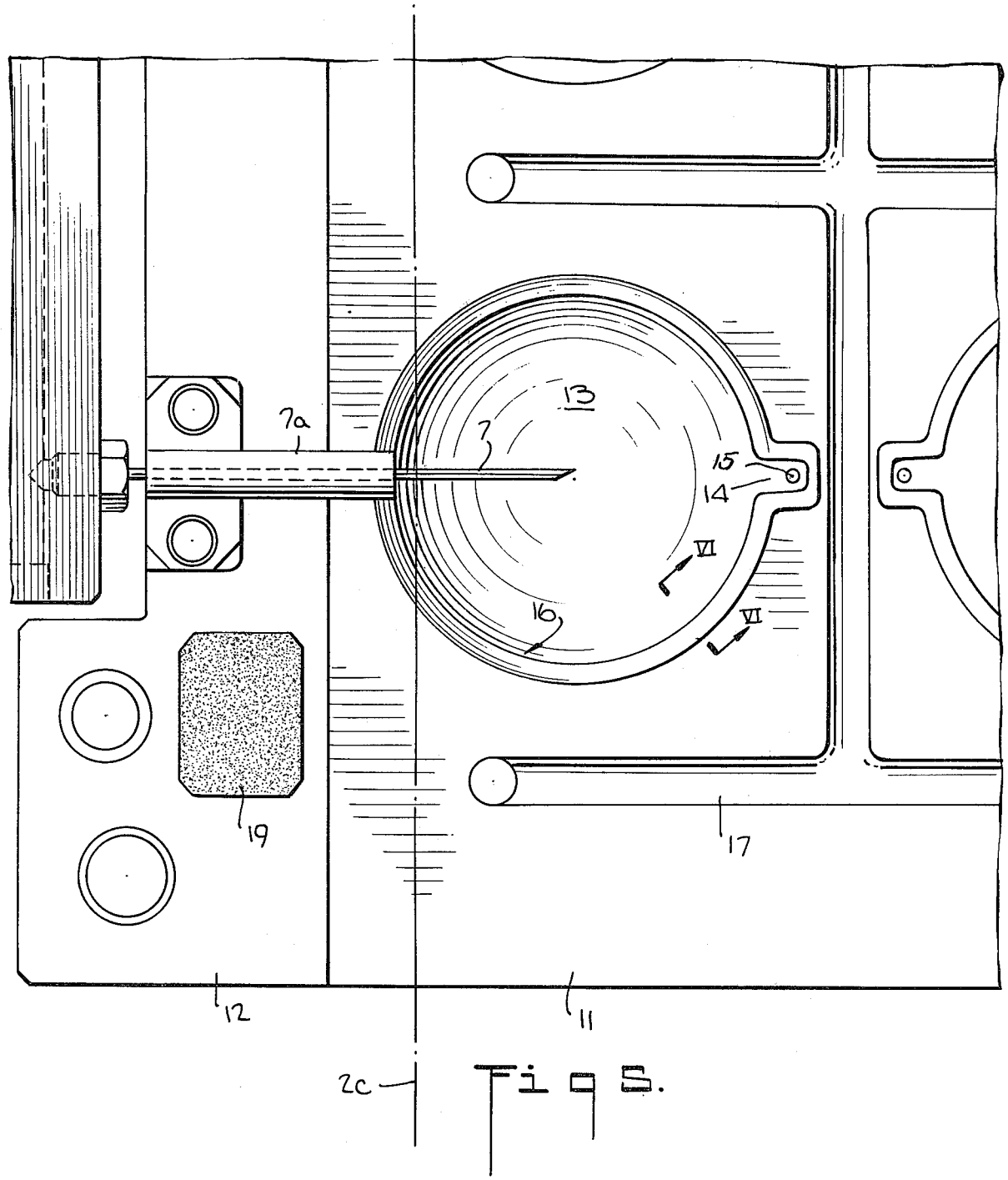
FIG. 5 is a top view taken from an actual working drawing and showing via only a left-hand corner of the die part, one of the die cavities with the understanding that the other five are substantially duplicates of the one shown.
Figure 6:
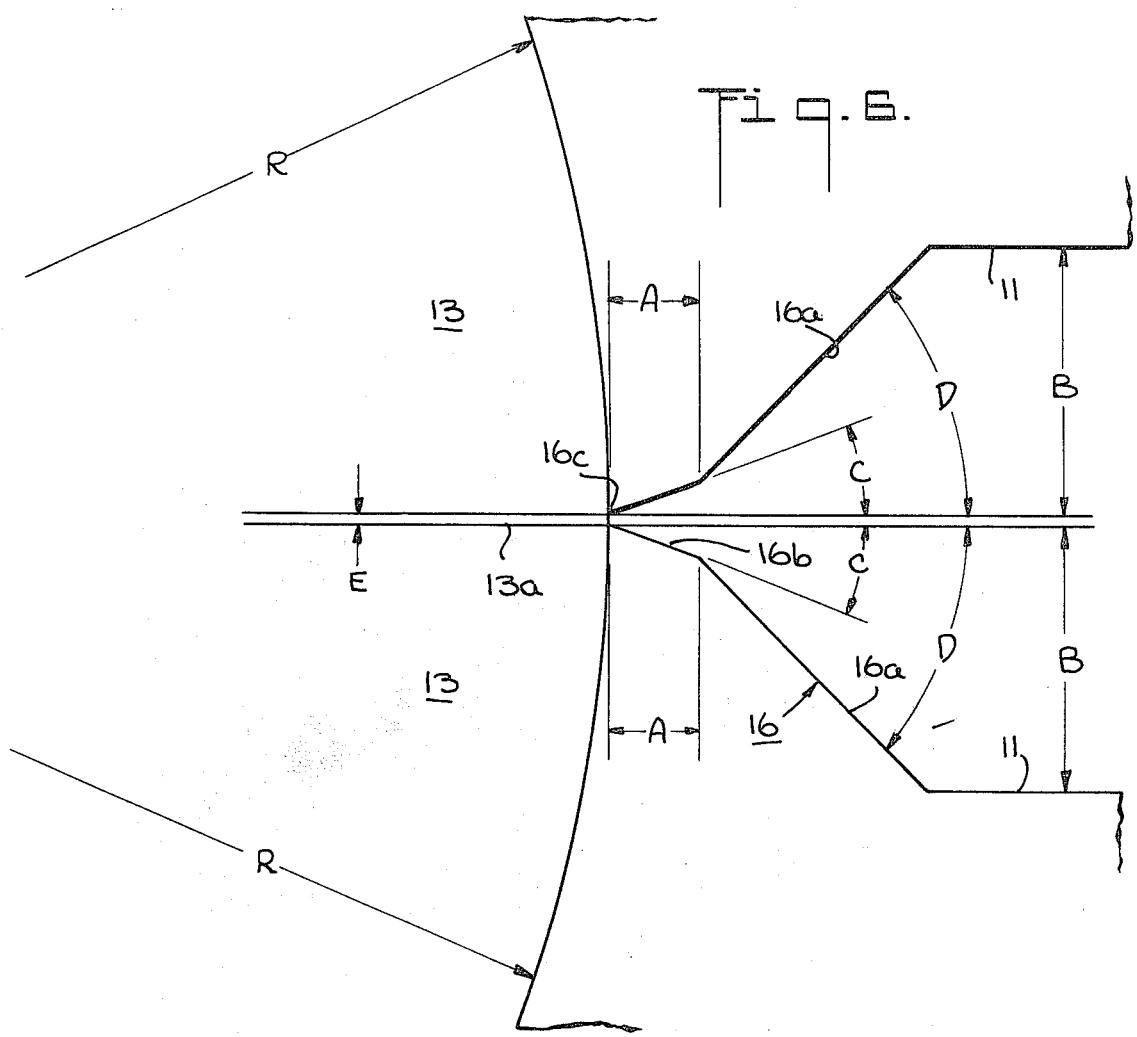
FIG. 6 is a greatly enlarged view taken on the line VI—VI in FIG. 5 and showing the pinch surfaces which form the new gate permitting ultrasonic degating.
Figure 7:
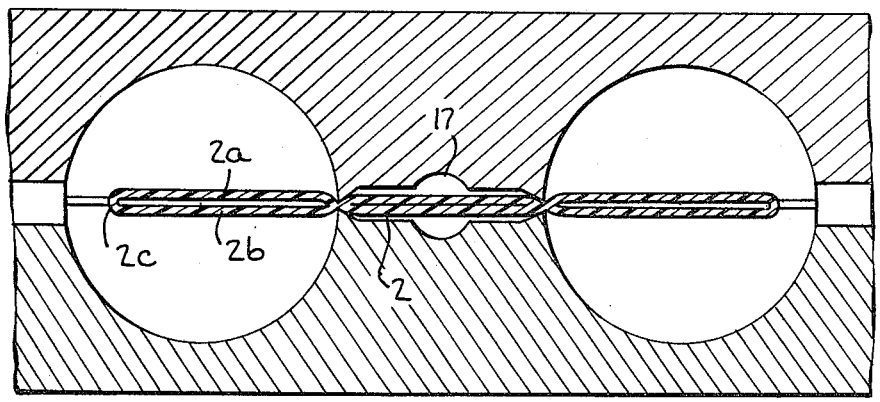
FIG. 7 schematically shows in a cross sectional view the die parts closed on the flattened parison.
Figure 8:
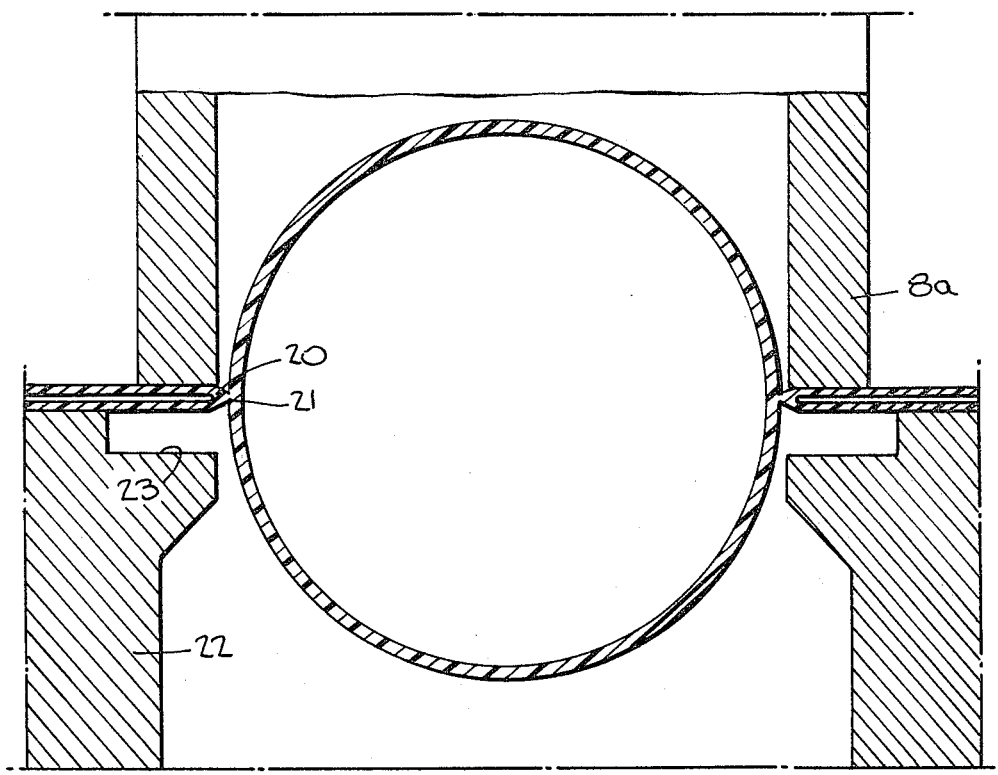
FIG. 8, again in cross section, schematically shows an ultrasonic tool's horn on one of the gates.
Figure 9:
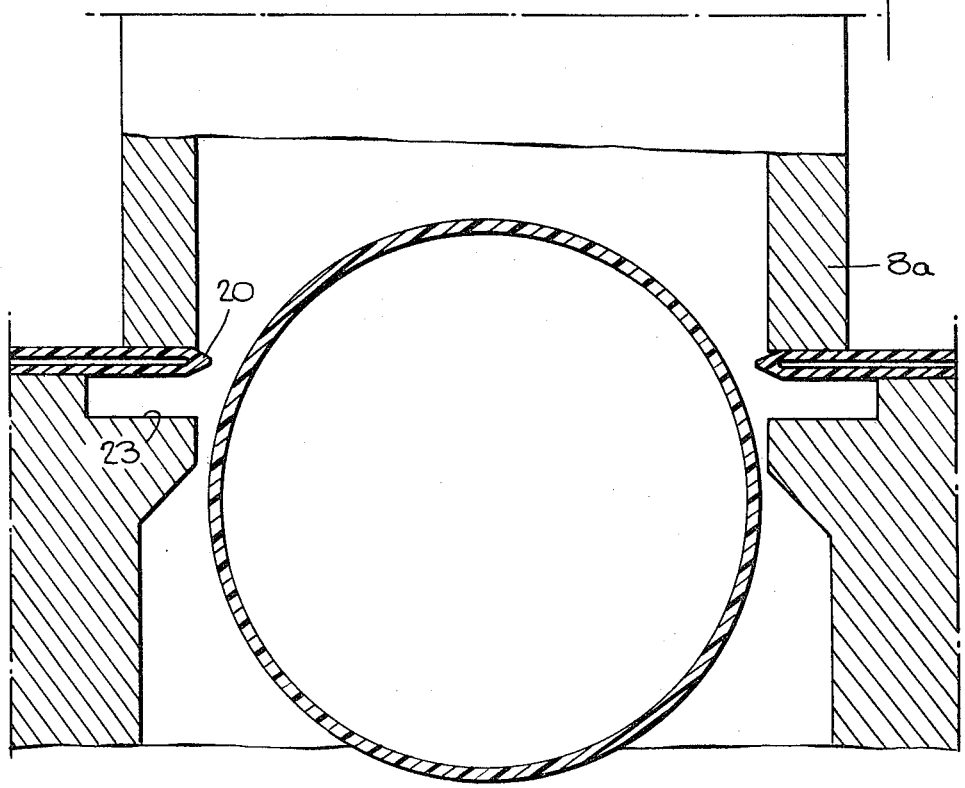
FIG. 9 is the same as FIG. 8 but shows the ball dropping due to the ultrasonic degating freeing the ball from the parison.

Having reference to the above drawings, FIG. 1 schematically shows the thermoplastic extruder 1 extruding the hot and thermally plasticized tubular thermoplastic parison 2 between the open die having the parts 3 and 4 each with a spine cavity 17, referred to later, and six cavities 5 for the balls; it also shows the die closed and entrapping the parison 2 for blow molding by the injection of pressurized air, first via the nozzle 6 for the spine and then via the needle blow pins 7 for the balls. The forcibly cooled die parts quickly harden the plastic of the parison enough so that the die can be opened, FIG. 2 showing the dropping blown parison resulting from die opening.

FIG. 3 shows the parison layed on a fixture or support having openings below the blown parts 9 and with a commercially available ultrasonic energy generator 8 with its horn 8a resting on the rim portion joining the parts 9 to the parison remainder and effecting the ultrasonic degating.

The details of the foregoing are disclosed hereinbelow, FIG. 4 serving to show that in the illustrated example the blown part is a Christmas tree ball 9 having a pierced stub 10 so it can be hung by the usual Christmas tree hanger hook. The ball 9 is thin-walled and should have a surface as free from imperfections as possible because it is ordinarily covered by rayon yarn to simulate a satin covering and through which any degating markings would be visible.

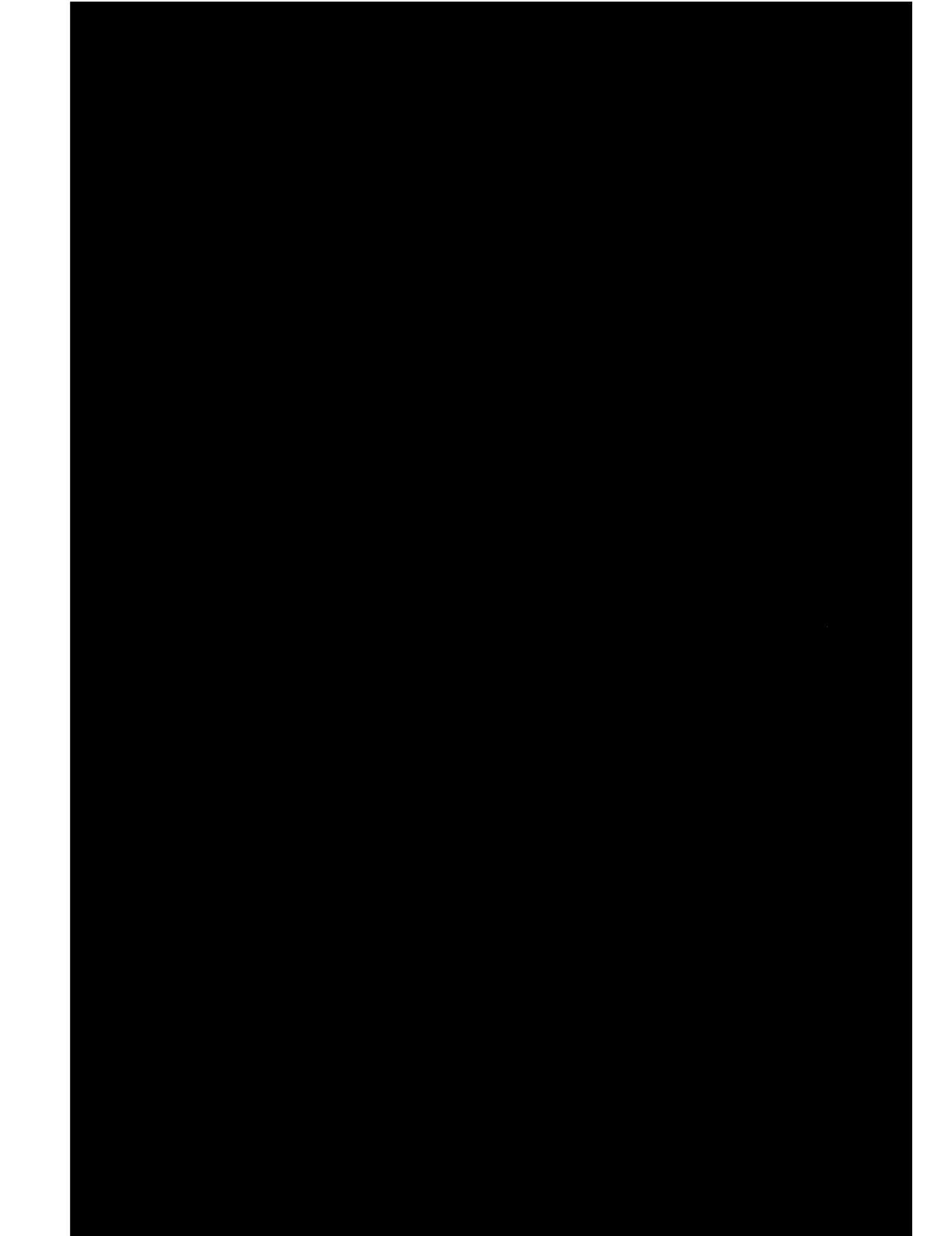

In FIG. 5, showing the lower left-hand side of one of the parts of the new blow mold, it can be seen that the mold has a recessed flat surface 11 with raised side surfaces 12 which interspace the surfaces 11 of the two parts when the die is closed, and one of the hemispherical cavities 13 which with the corresponding cavity of the other die part forms the complete molding cavity for one of the balls. The cavity is formed with a small extension 14 shaped to form the stub 10 of the ball and provided with a pin 15 so that when closed with the